United States Patent [19]

Islam et al.

[11] Patent Number: 5,774,641
[45] Date of Patent: Jun. 30, 1998

[54] COMPUTER STORAGE DRIVE ARRAY WITH COMMAND INITIATION AT RESPECTIVE DRIVES

[75] Inventors: Shah Mohammad Rezaul Islam, Cary; Andrew Boyce McNeill, Jr., Apex, both of N.C.; Bruce M. Cassidy, Pleasanton, Calif.

[73] Assignee: International Business Machines Corporation, Armonk, N.Y.

[21] Appl. No.: 528,484

[22] Filed: Sep. 14, 1995

[51] Int. Cl.⁶ .................................................. G06F 11/00
[52] U.S. Cl. ...................................................... 395/182.04
[58] Field of Search ....................... 395/182.04, 185.05, 395/500; 364/268.9, 944.2, 944.61, 966.5, 970; 371/40.1

[56] References Cited

U.S. PATENT DOCUMENTS

| | | | |
|---|---|---|---|
| 5,440,727 | 8/1995 | Bhide et al. | 395/444 |
| 5,504,858 | 4/1996 | Ellis et al. | 395/182.04 |
| 5,519,844 | 5/1996 | Stallmo | 395/441 |
| 5,519,849 | 5/1996 | Malan et al. | 395/500 |
| 5,533,190 | 7/1996 | Binford et al. | 395/182.04 |
| 5,617,425 | 4/1997 | Anderson | 371/10.2 |
| 5,634,033 | 5/1997 | Stewart et al. | 395/441 |

OTHER PUBLICATIONS

IEE Transactions On Computers, vol. 42, No. 6, Jun. 1993. The Performance Of Parity Placements in Disk Arrays.
Patterson et al., "A Case For Redundant Arrays Of Inexpensive Disks (RAID)", pp. 1–23, ACM, 1988.
HSIAO et al., "A Performance Study of Three High Availability Data Replication Strategies", IEEE, 1991, pp. 18–28.

*Primary Examiner*—Robert W. Beausoliel, Jr.
*Assistant Examiner*—Stephen C. Elmore
*Attorney, Agent, or Firm*—George E. Grosser

[57] ABSTRACT

In a data processing system, a redundant array of storage devices is provided for storing data from a host data processing system. When a selected, storage device receives a write command, the selected storage device reads old data from the logical address specified in the write command, and temporarily stores such old data in a buffer. Next, the selected storage device writes new data from the host data processing system to a location specified in the write command. Thereafter, an XOR operation is performed in the selected storage device between the new data and the old data to produce intermediate data. The intermediate data is then transferred to a second storage device within the array. Within the second storage device, old parity data is read from the media in the second storage device and placed in a buffer. Next, an XOR operation is performed in the second storage device between the intermediate data and the old parity data to produce new parity data. Finally, such new parity data is written in the second storage device. Commands for reading data, writing data, performing XOR operations, and transferring data are all generated and executed within the storage devices which comprise the redundant array of storage devices.

8 Claims, 11 Drawing Sheets

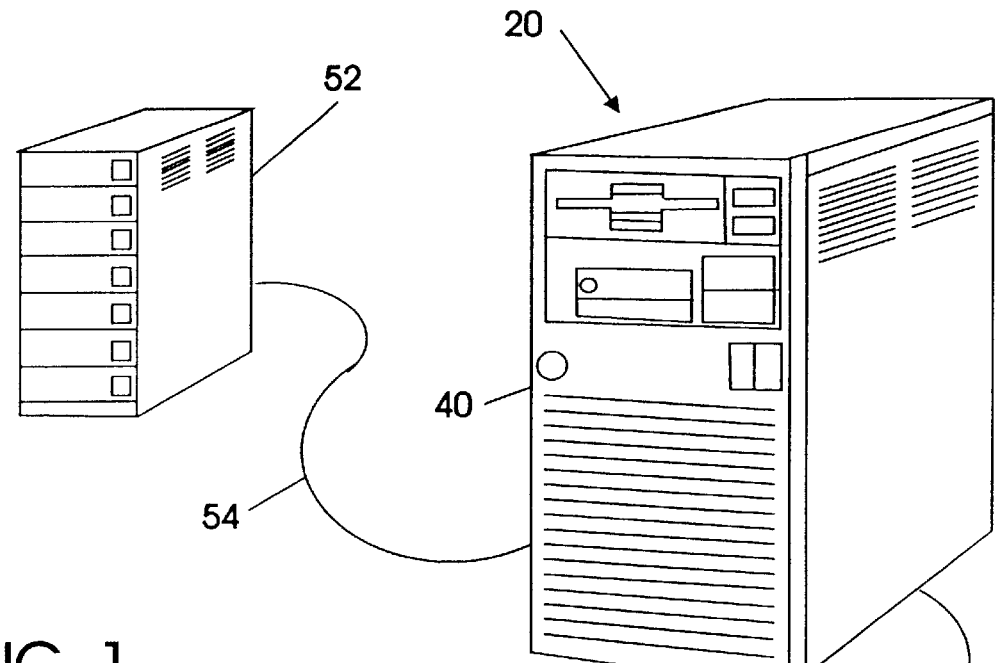
FIG. 1
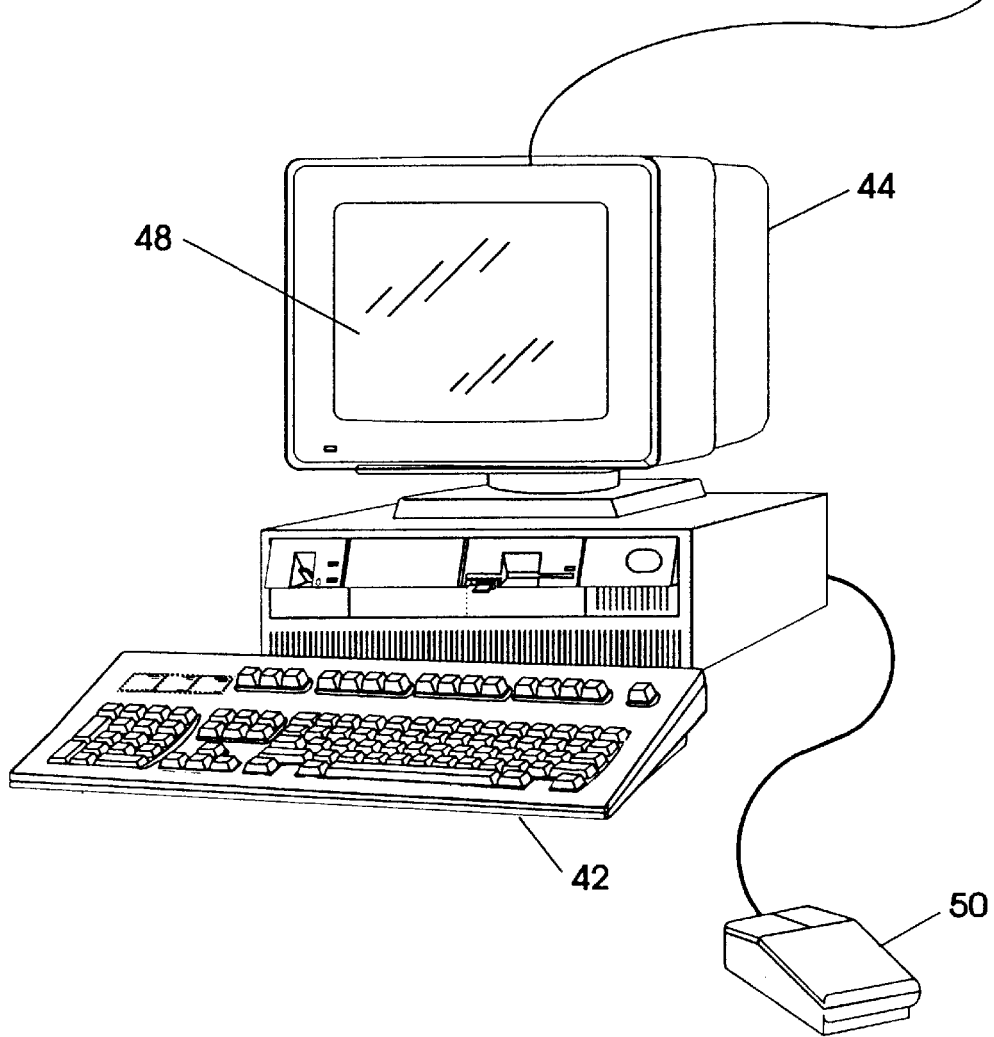

| FIG. 8A | FIG. 8B |

COMPUTER STORAGE DRIVE ARRAY WITH COMMAND INITIATION AT RESPECTIVE DRIVES

BACKGROUND OF THE INVENTION

1. Technical Field

The present invention relates in general to an improved data processing system, and in particular to an improved method and apparatus for redundantly storing data in a data processing system. Still more particularly, the present invention relates to a method and apparatus for storing data in fault tolerant array of storage units having control processing distributed in the array of storage units.

2. Description of the Related Art

A recently developed disk memory structure with improved performance at relatively low cost is the "redundant array of inexpensive disk"(RAID) (see, for example, David A Patterson, et al., "A Case For Redundant Arrays Of Inexpensive Disks (RAID)", Department of Electrical Engineering and Computer Sciences, University of California, Berkeley, Calif., 94720, 1988 ACM 0-89791-268-3/88/0006/0109, pp.109–116.). As discussed in the Patterson et al. reference, the increasingly large personal computer market has supported the development of inexpensive disk drives having a better ratio of performance to cost than Single Large Expensive Disk (SLED) systems. The number of inputs/outputs (I/Os) per second per read/write head in an inexpensive disk is within a factor of two of the larger SLED systems. Therefore, the parallel transfer from several inexpensive disks in a RAID architecture, in which an array of inexpensive disks function as a single logical disk drive, produces greater performance, at a lower price, than a SLED.

Unfortunately, when data is "stripped" or distributed to more than one disk, the mean time between failures varies inversely with the number of disks in the array. To correct for this decreased mean time between failures of the system of disks, error recognition and correction is built into the RAID systems. The Patterson et al. reference discusses five RAID embodiments each having a different means for error recognition and correction. These RAID embodiments are referred to as RAID levels 1–5.

RAID level 1 utilizes complete duplication of data (sometimes called "mirroring"). Thus, RAID level 1 has a relatively small performance advantage per disk ratio over a conventional disk. RAID level 2 improves this performance, as well as the capacity per disk ratio, by utilizing error correction codes that enable a reduction of the number of extra disks needed to provide error correction and disk failure recovery.

In RAID level 2, data is interleaved onto a group of G data disks, and error codes are generated and stored onto an additional set of C disks referred to as "check disks." Such check disks are utilized to detect and correct a single error.

Such error codes enable the detection and correction of random single bit errors in data, and also enables the recovery of data if one of the G data disks crashes.

Since only G of the C+G disks carries user data, the performance per disk is proportional to G/(G+C). Because G/C is typically significantly greater than 1, RAID level 2 may exhibit an improvement in performance per disk over RAID level 1. Additionally, one or more spare disks may be included in the system so that if one of the disk drives fails, the spare disk may be electronically switched into the RAID to replace the failed disk drive.

RAID level 3 is a variant of RAID level 2 in which the error detecting capabilities that are provided by most existing inexpensive drives are utilized to enable the number of check disks to be reduced to one. This increases the relative performance per disk over that of RAID level 2. Parity, instead of error correcting codes, are employed on the check disk.

The performance criteria for small data transfers, such as utilized in transaction processing, is known to be poor for RAID levels 1–3 because data is interleaved among the disks in bit-sized or byte-sized blocks, such that even for a data access of less than one sector of data, all disks must be accessed. Therefore, to improve this performance, RAID level 4, which is a variant of RAID level 3, interleaves data onto the disks in a sector interleave mode instead of in a bit or byte interleave mode as is utilized in levels 1—3. This results in the elimination of the need to access all disks during a small data access (i.e., accesses smaller than G+C sectors of data). This in turn allows independent parallel read accesses to an array of drives, and reduces the amount of competition among separate data access requests to access the same data disk at the same time.

However, the performance of RAID level 4 remains limited because of access contention for the check disk during write operations. For all write operations, the check disk must be accessed in order to store updated parity data on the check disk for each stripe (i.e., row of sectors) of data into which data is written. Patterson et al. observed that in RAID level 4 and level 5, an individual write to a single sector does not involve all of the disks in a logical mass storage device since the parity bits on the check disk is a single exclusive OR (XOR) of all the corresponding data bits in a group. In RAID level 4, write operations always involve reading from and writing to the parity drive, causing the bottleneck in the array. RAID level 5, which is a variant of RAID level 4, mitigates the contention problem during write operations by distributing the parity check data and user data across all disks in the array.

Both RAID level 4 and 5 require four accesses to locations on two disks with each read-modify-write operation. Each of such operations involves one read access of the user data and the parity check data followed by a write of new user data and modified parity data. The two read accesses are required to recalculate the parity, which is determined using the following function:

New parity =(old data .XOR. new data) .XOR. old parity.

Known RAID implementations utilize an expensive central controller coupled to a host data processing system. Such a controller may distribute user data among the disk drives in the array, and calculate and distribute parity data, which may be utilized to recover lost user data. Part of this central controller includes a data processor for creating or calculating data which may be utilized to reconstruct data that was stored on a failed disk. In the RAID level 5 implementation, such a data processor is an "XOR engine." The "XOR engine" may be utilized to calculate parity data according to the equation given above, and, upon receiving a request to read data stored in a failed disk drive, to reconstruct data stored in such a failed disk drive.

The performance of such an XOR engine in the central controller is important to the performance of the overall data processing system. As shown in the equation above, two XOR operations are necessary for each write operation. If the host data processing system reads from a failed disk drive, and it is necessary to reconstruct data, the number of XOR operations is equal to G–2, where G is the number of disk drives in the array. Thus, as more disk drives are added to the prior art array, the performance of the XOR engine does not improve; the performance of the XOR engine is not scalable as additional disk drives are added to the array. As more disk drives are added to the array, the ability to process additional XOR operations is limited by the utilization of a single XOR engine. Furthermore, when a disk failure occurs, the ability to continue to operate this degraded mode requires additional XOR operations that need to be supported by the XOR engine.

Another disadvantage of the RAID implemented utilizing a central controller is that performance is limited because additional transfers over the SCSI bus are required each time the host data processing system writes to the RAID. For example, to write to a prior art, central controller implementation of RAID, the following four data transfers are necessary: (1) move the old data from the data disk to the controller, (2) move the old parity data from the parity disk to the controller, 3) move the new data from the controller to the data disk, and (4) move the new parity data from the controller to the parity disk. During a read from a failed disk drive, or a write to a failed disk drive, the number of data transfers between drives and the central controller increases as the number of drives in the RAID increases. Such an increase in data transfers limits the performance of the RAID.

Yet another disadvantage of utilizing a central controller to implement a RAID is that special software is required in the host data processing system to support various RAID algorithms.

Therefore, the problem remaining in the prior art is to provide a method and apparatus for implementing a RAID that does not require an expensive central controller, that is scalable in performance and cost as drives are added to the array, that does not require excessive data transfers over the communications bus (e.g., SCSI bus) during read and write operations, and that does not require special software in the host data processing system.

SUMMARY OF THE INVENTION

Briefly according to the invention, a data processing system includes a fault tolerant array of storage units for storing data from a host data processing system. When a selected storage unit receives a write command, the selected storage unit reads old data from the logical address specified in the write command, and temporarily stores such old data in a buffer. Next, the selected storage unit writes new data from the host data processing system to a location specified in the write command. Thereafter, an XOR operation is performed in the selected storage unit between the new data and the old data to produce intermediate data. The intermediate data is then transferred to a second storage unit within the array. Within the second storage unit, old parity data is read from the media in the second storage unit and placed in a buffer. Next, an XOR operation is performed in the second storage unit between the intermediate data and the old parity data to produce new parity data. Finally, such new parity data is written in the second storage unit. Commands for reading data, writing data, performing XOR operations, and transferring data are all generated and executed within the storage units which comprise the fault tolerant array of storage units.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 depicts a data processing system which may be utilized to implement a preferred embodiment of the present invention;

FIGS. 9, 9A, and 9B represent a flowchart of the steps taken in the process of writing to a failed disk drive in a DRAID in accordance with the method and apparatus of the present invention.

DETAILED DESCRIPTION OF PREFERRED EMBODIMENT

Figure 2:
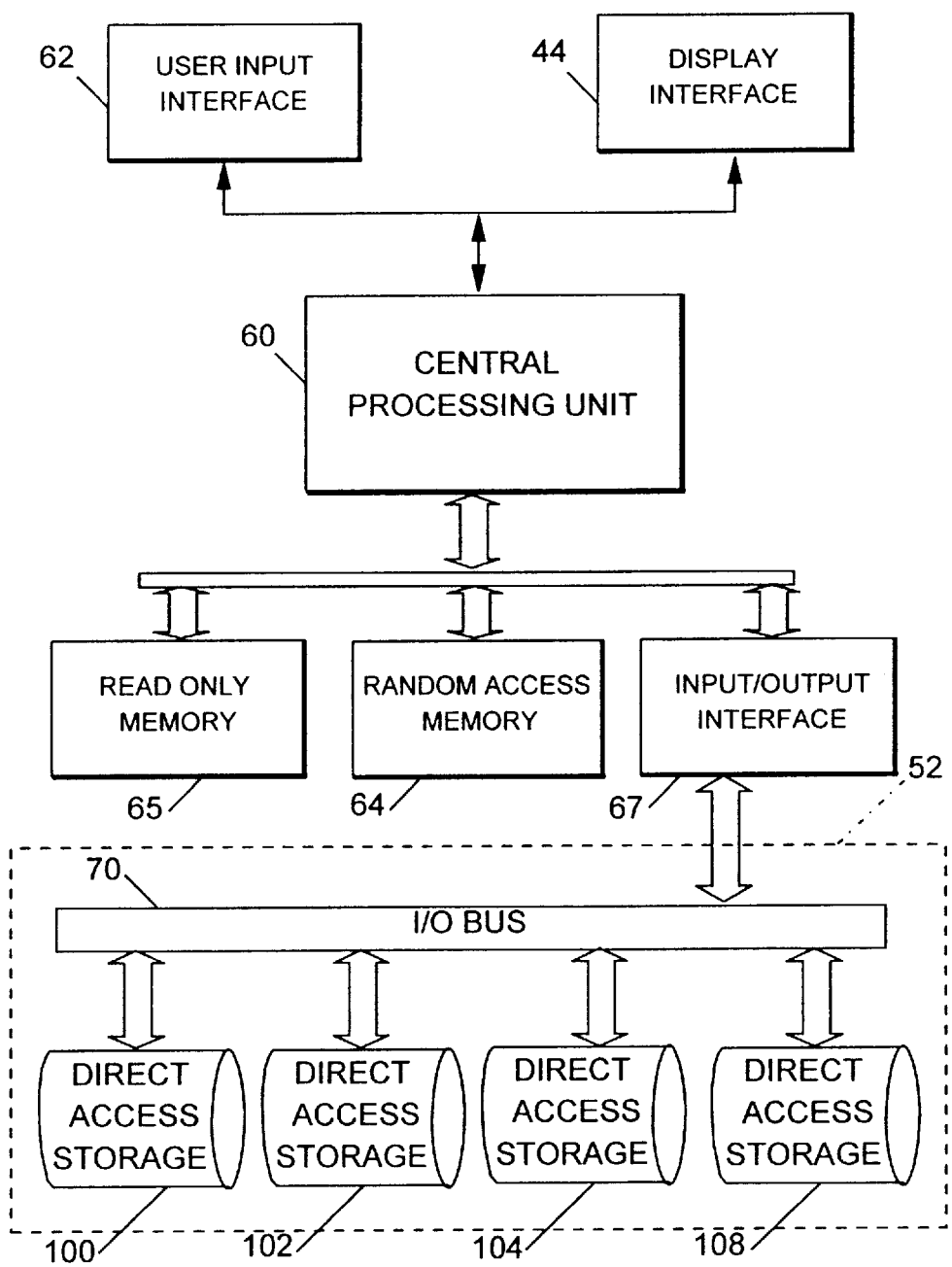
FIG. 2 is a block diagram of processor complex and storage sub-system of the data processing system of FIG. 1.

With reference now to the figures and in particular with reference to FIG. 1, there is depicted a data processing system 20 which includes processor 40, keyboard 42, and display 44. Keyboard 42 is coupled to processor 40 via cable 46. Display 44 includes display screen 48, which may be implemented utilizing a cathode ray tube (CRT), a liquid crystal display (LCD), an electroluminescent panel, or the like. Data processing system 20 also includes pointing device 50 which may be implemented utilizing a track ball, joystick, touch sensitive tablet or screen, or as illustrated in FIG. 1, a mouse. Pointing device 50 may be utilized to move a pointer or cursor on display screen 48. Processor 40 is coupled to a peripheral storage sub-system 52 via cable 54. In a preferred embodiment, the storage sub-system 52 comprise a Redundant Array of Inexpensive Drives otherwise known as RAID devices which communicate with the processor 40 via a Small Computer System lnterface(SCSI). Thus, cable 54 is a SCSI cable and the storage sub-system 52 are capable of interfacing with a SCSI bus.

Those persons skilled in the art of data processing system design will recognize that display 44, keyboard 42, and pointing device 50 may each be implemented utilizing any one of several known off-the-shelf components. Data processing system 20 may be implemented utilizing any so-called "personal computer," such as the personal computer sold under the trademark "PS/2" by International Business Machines Corporation (IBM), of Armonk, N.Y.

Referring to FIG. 2, a block diagram of the processor complex 40 of FIG. 1 is shown. The processor complex 40 is primarily controlled by execution, by a central processing unit (CPU) 60, of Basic Input and Output Software (BIOS) instructions stored in a Read Only Memory (ROM) 65 and operating system instructions stored in the storage sub-system 52. CPU 60 is coupled to the display device 44 and keyboard 42 and mouse 50 thru a well known user interface device 62 which is utilized for displacing text and graphics as well as for receiving input from a data processing system user. Random Access Memory device 64 and ROM 65 are coupled to the CPU 60 thru a local processor bus 66 in a well known manner thus allowing for transfer of data when the CPU 60 executes operating instructions, such as those dictated by its Basic Input and Output Software (BIOS) or the Operating System. The CPU 60 is also coupled through the local bus 66 to a I/O interface 67 which interfaces local bus protocol of the local bus 66 to a I/O bus protocol compliant with an I/O bus 70. The bus protocol of the 110 bus 70 is preferable a standard, predefined serial or parallel protocol, such as the SCSI bus protocol, Peripheral Component Interconnect (PCI) bus protocol, Integrated Device Electronics (IDE) bus protocol. In describing the present invention the applicants have chosen the SCSI bus protocol as an exemplary I/O bus protocol. However, it should be noted that the present invention could be easily implemented utilizing any other parallel or serial bus protocol which allows two or more sub-system transfer and process raw data and control information in a predefined manner. FIG. 2, also illustrates the storage subsystem 52 which is a Distributed RAID (DRAID) storage sub-system. The DRAID storage subsystem 52 includes a plurality of DRAID disk drives 100, 102, 104, 106, and 108. As shown, the DRAID drives 100–108 are coupled to the processor complex 40 thru the I/O bus 70. The DRAID drives 100–108 are redundantly coupled to each other and follow a predefined striping and data protection RAID protocol for storing, among other things, data, operating system and/or application files.

Figure 3:
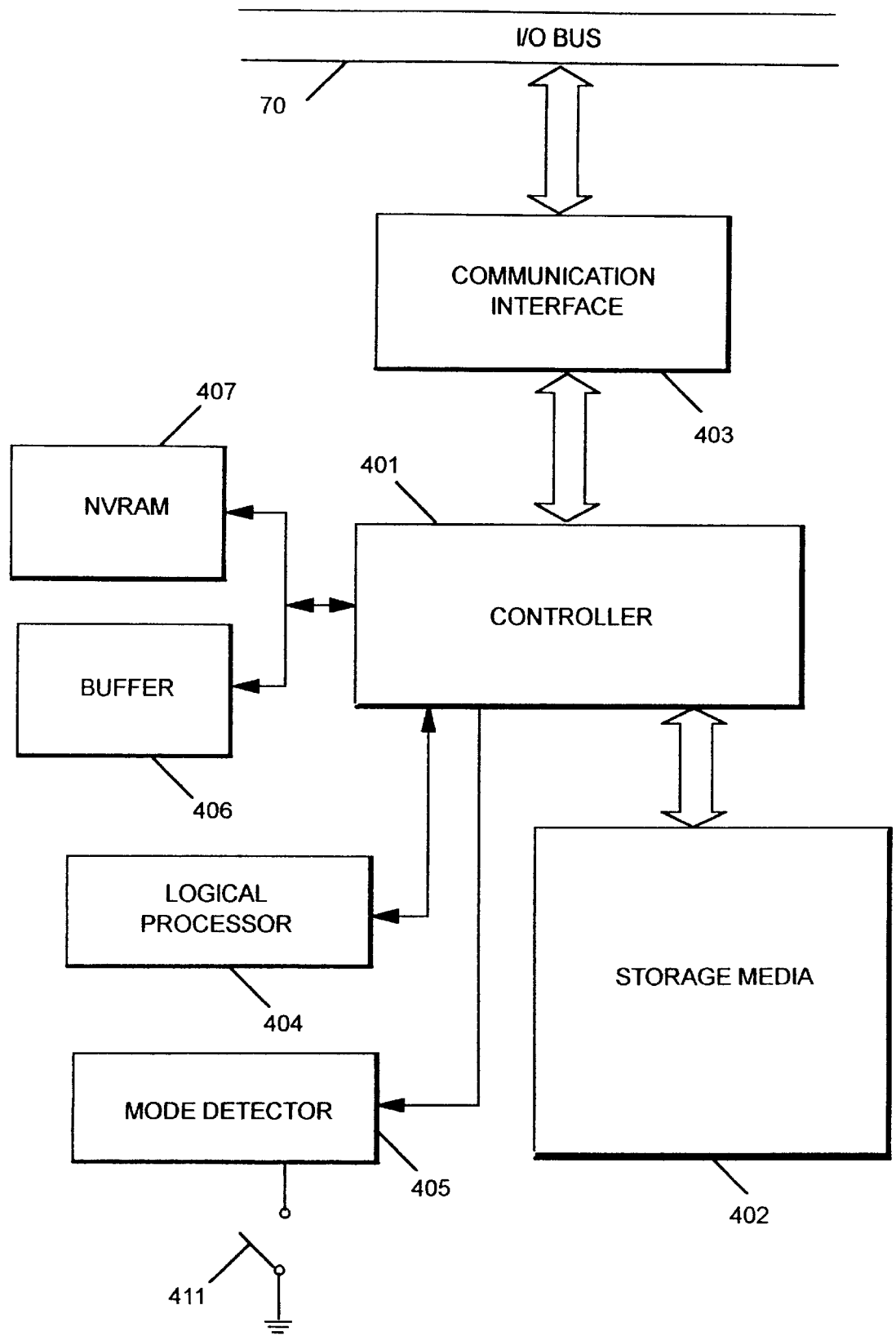
FIG. 3 is a block diagram of a DRAID storage device used in the data processing system of FIG. 1

Referring to FIG. 3, a block diagram of a DRAID drive 400 which is identical to the DRAID drives 100–108 of FIG. 2 is shown. The DRAID drives 400 includes a controller 401 which controls among other things data transfers between a storage media 402 and a communication interface 403. The storage media 402 could be one of a variety of well known magnetic, optical or solid state storage devices, such as hard disk drives, tape drives, CD-ROMS, WORM drives, etc. As mentioned above, the communication interface 403 utilizes the SCSI bus protocol when transferring control and raw data between the controller 401, the storage media 402, and the processor complex 40 over the IO bus 70. Furthermore, the controller is programmed to generate commands to initiate data processing which can be transmitted over the I/O bus 70 and received by another DRAID drive by the bus to execute a predetermined set of operations. Also the controller is programmed to receive and decode such commands and perform such predefined operations based on the decoded command. As such the controller 401 comprises means for generating commands to initiate data processing that can be transferred over the I/O bus 70 as well as means for receiving and decoding such commands from said bus. A mode detector 405 allows the controller 401 to operate in one of a DRAID mode or a normal mode. The mode detector 405 is responsive to mode signal which could be set by a jumper 411 to force the controller 401 to operate in either the DRAID or the normal mode. A logical processor 404 is incorporated into the DRAID drive 400 and performs XORing and other logical functions required when data is being read or written into the storage media 402. A buffer 406 acts as a temporary storage space for storing interim data generated by the logical processor 404 and other devices withing the DRAID drive 300. A battery backed non-volatile RAM (NVRAM) is used to store the information and commands to insure data integrity when the DRAID drive 400 experiences an unexpected power interruption. The controller 401 also includes a dock (not shown) which is used for time stamping certain events when operating the DRAID drive 400 according to the present invention.

Initialization

The operation of the present invention begins with an initialization procedure. According to the present invention, any one of the DRAID drives 100–108 connected to a host data processing system may be placed in the "normal" mode or the "DRAID mode". When a DRAID drive is switched from the normal mode to the DRAID mode, and power is applied to the DRAID drive for the first time, the DRAID drive executes an initialization procedure.

During such initialization procedure, each DRAID drive in the array communicates with the other DRAID drives in the array over the SCSI bus connecting them to each other. This communication permits the DRAID drives of the array to pass information necessary to define the array. Information that may be passed includes size of each drive, drive ID numbers, stripe unit size, etc. Once the array is defined, a detailed description of the array and associated array parameters are stored in a reserved area on each RAID drive. In addition to the detailed description of the array and the array parameters, each DRAID drive using dock 412 of FIG. 3 may also store time stamp indicating the time of initialization, and serial numbers of all storage devices in the array. This information may be utilized during a subsequent power up to determine the current state of the DRAID drive array, and to determine whether or not a data rebuilding process is necessary. The data rebuilding process is discussed in detail below.

If a DRAID drive is powered up in a normal mode, information describing the configuration of a previous array may be removed from the DRAID drive if the drive had previously stored such information while the drive was a member of another array. If the drive is thereafter reinitialized in the DRAID mode, the drive may become part of another DRAID storage sub-system. When a drive is powered up in a DRAID mode, the drive internally searches the storage media for configuration data. If configuration data is present, the DRAID drive communicates with other drives in the DRAID. All drives powered up in the DRAID mode and having no configuration data stored in the reserved area of the drive may coordinate to form a new array.

Also during initialization, each drive constructs a "map" that describes the location of data in the DRAID drive. Also the map describes the location of parity data associated with such data. This parity data is always stored on another drive in the array. Because the relationship between parity data and its location are deterministic, a mathematical algorithm may be used as an alternative to. One such mathematical algorithm known in the art is described by Edward K. Lee, in an article titled "The performance of Parity Placement in Disk Arrays", IEEE TRANSACTIONS ON COMPUTERS, VOL 42, NO. 6, JUNE 1993, pages 651–464 Thus, allowing for determination of the relationship when accessing parity data. The information in such a map enables a DRAID drive to locate the parity drive during write operations, and the necessary data and parity data stored on other drives in the array which must be recalled to reconstruct data when the host data processing system reads from a failed drive in the array.

In the preferred embodiment, as a new DRAID is initialized, drives form pairs of "buddies." In such a pair of buddies, one drive is the "master buddy"(MB), and the other drive is the "slave buddy"(SB). Thus, every DRAID drive in the array is a master buddy to another drive, and a slave buddy to yet another drive in the array. During normal operation, the master buddy drive continuously monitors the operation of the slave buddy drive. If the slave buddy drive appears to be functioning improperly, the master buddy drive is interposed and may perform operations in the place of the slave buddy drive. One indicator that the slave buddy drive is functioning improperly may be that the slave buddy responds improperly to a request from the host data processing system, or to a request from any another drive in the array. The foregoing MB and SB configuration allows the DRAID storage sub-system of the present invention to be highly scalable. That is, under this arrangement, additional DRAID devices may be added without creating a bottle neck on any given drive. It should be pointed out that although the distributed MB and SB arrangement is preferred, the present invention also contemplates a central DRAID drive monitoring scheme where one or more DRAID drives may be monitoring a plurality of other DRAIDS. For example, one or more central DRAIDS could be monitoring a plurality of other DRAIDS.

Figure 4:
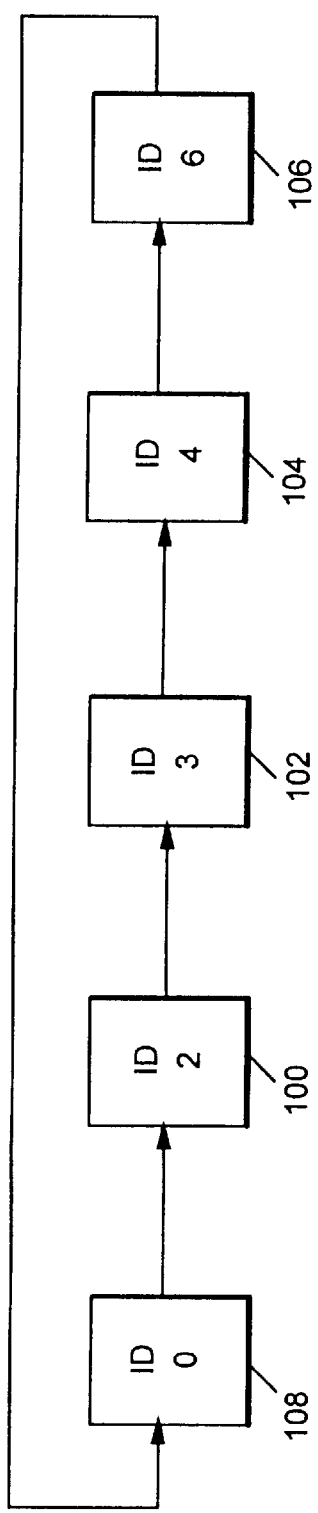
FIG. 4 is a block diagram of the relationship between master buddy drives and slave buddy drives in the DRAID in accordance with the method and apparatus of the present invention.

The above described DRAID drive monitoring system is now more fully described in conjunction with the block diagram illustrated in FIG. 4. The DRAID 100, which has been assigned SCSI ID "2," is the master buddy drive for DRAID 102, as indicated by the arrow from DRAID 100 to DRAID device 102. DRAID device 100 may be responsible for monitoring the operation of DRAID drive 102 and may respond to requests or commands directed to DRAID drive 102, if DRAID drive 102 fails. These operations will be described in greater detail below.

DRAID drive 100 is also the slave buddy to DRAID drive 108. In a similar manner, DRAID drive 102 is the master buddy of DRAID drive 104 and the slave buddy of DRAID drive 100, DRAID drive 104 is the master buddy of DRAID drive 106 and the slave buddy of DRAID drive 102, and DRAID drive 106 is the master buddy of DRAID drive 108 and the slave buddy of DRAID drive 104.

Once initialized, each DRAID drive reports a capacity of (N−1)/N percent of its normal capacity to the host data processing system, where N is the number of drives in an array of drives which have equal capacity. This reduction in capacity is because each drive must reserve a portion of its capacity for parity data which is associated with data on other DRAID drives in the array.

Figure 5:
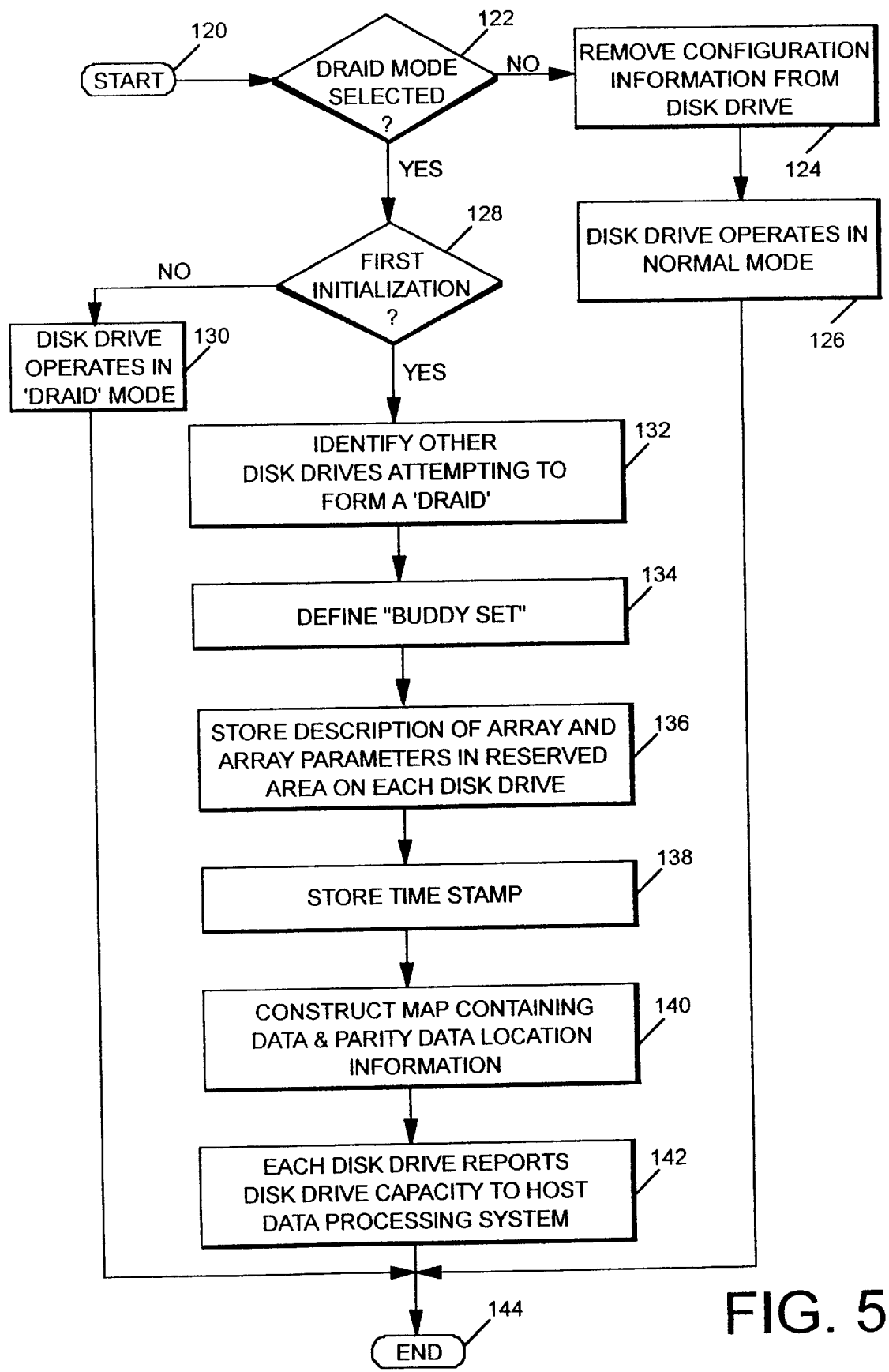
FIG. 5 is a flowchart of the steps taken in the process of initializing an array of storage units connected to a host data processing system in accordance with the method and apparatus of the present invention.

Referring to FIG. 5, flowchart of steps taken during the process of initializing a DRAID storage sub-system in accordance with the method and apparatus of the present invention is shown. As illustrated, the process begins at block 120 and thereafter passes to block 122. Block 122 illustrates the determination of whether or not the DRAID drive is powered up with the DRAID mode selected. If the DRAID mode is not selected, the process may remove the configuration data stored on the DRAID drive while the DRAID drive was a member of a previous DRAID storage sub-system, as depicted at block 124. Thereafter, the DRAID drive may operate in a normal mode, as illustrated at block 126.

If the DRAID drive has been powered up in the DRAID mode, the process determines whether or not this is the first initialization since being switched from the normal mode to the DRAID mode, as depicted at block 128. If the process determines that this is not the first initialization, the process causes the DRAID drive to operate in the DRAID mode, as illustrated at block 130. If the process determines that this is the first initialization since being switched from the normal mode to the DRAID mode, the process identifies other DRAID drives attempting to form a DRAID, as depicted at block 132. Next, the process defines a buddy set, as illustrated at block 134. In the process of defining a buddy set, each DRAID drive selects a slave buddy, thus becoming a master buddy to that selected slave buddy.

Next, the process stores a description of the array and array parameters in a reserved area on each DRAID drive, as depicted at block 136. As part of such description of the array, the process may also store a time stamp, as illustrated at block 138. As depicted at block 140, the process then constructs a map containing the location of data and the associated parity data. Alternatively, as described before, the process may determine the location of the parity data using a predetermined mathematical formula.

Finally, each DRAID drive in the DRAID storage sub-system computes and saves its usable capacity for later reporting to the host data processing system, as illustrated at block 142. The process of initializing a DRAID drive ends at block 144.

Read Operation

During a read operation, each drive may respond to a read request from the host data processing system as if that drive were not part of a DRAID. The only difference between reading an ordinary group of DRAID drives and reading from DRAID is that drives in a DRAID have reduced capacity because certain sectors of each drive have been reserved for parity data.

Figure 6:
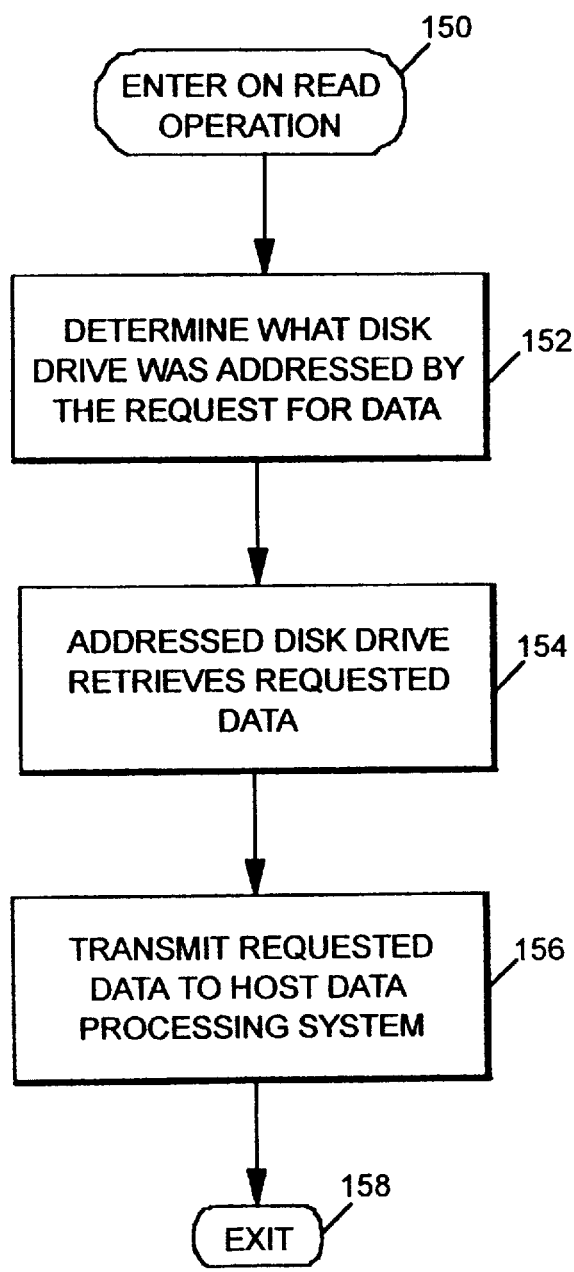
FIG. 6 is a flowchart of the steps taken in the process of reading data from a fully functional DRAID in accordance with the method and apparatus of the present invention.

FIG. 6, depicts flowchart of the steps taken in the process of reading data from a fully functional DRAID storage sub-system in accordance with the method and apparatus of the present invention. As illustrated, the process begins at block 150 and thereafter passes to block 152. Block 152 illustrates the process of determining what DRAID drive was addressed by the request for data. Such a process may use the SCSI ID associated with the READ request to identify an addressed DRAID drive. Next, the addressed DRAID drive retrieves the requested data, as depicted at block 154. Finally, as illustrated at block 156, the process transmits the requested data to the host data processing system. The READ operation terminates as depicted at block 158.

Write Operation

When a selected DRAID drive in the DRAID storage sub-system receives a write request from a host data processing system that DRAID drive (i.e., the data drive) may perform two operations. These operations are: (a) a "read-write-XOR" operation, and (b) a "write-XOR" operation. In the read-write-XOR operation, the data drive reads the old data stored on the DRAID drive at the location specified by the logical block address (LBA) in the host's write request, and temporarily stores this data in the DRAID drive buffer 406 of FIG. 3. The new data from the host data processing system is then written at the specified LBA. During substantially the same period of time, the new data from the host is exclusive-ORed (XORed) with the old data using the logical processor 404 of FIG. 3. The result of the XOR operation is stored in the DRAID drive buffer 406 in the data drive. This resulting data is then transferred over the SCSI bus to another DRAID drive in the array for further processing.

The write-XOR operation is executed within a DRAID drive that is selected to store the parity data associated with the new data written by the host data processing system (i.e., the parity drive). In the write-XOR operation on the parity drive, data transferred from the DRAID drive buffer 406 of the data drive is exclusive-ORed with the old parity data stored on the parity drive. Then, the result of this XOR operation in the parity drive is written back to the DRAID at the location of the old parity data. This write-XOR operation in the parity drive is initiated by a command from the data drive. Transmission of such command structure follows well known protocol defined by the SCSI bus protocol, After the parity drive has successfully written the parity data, the parity drive sends status to the data drive. Thereafter, the data drive sends status the host data processing system.

Figure 7:
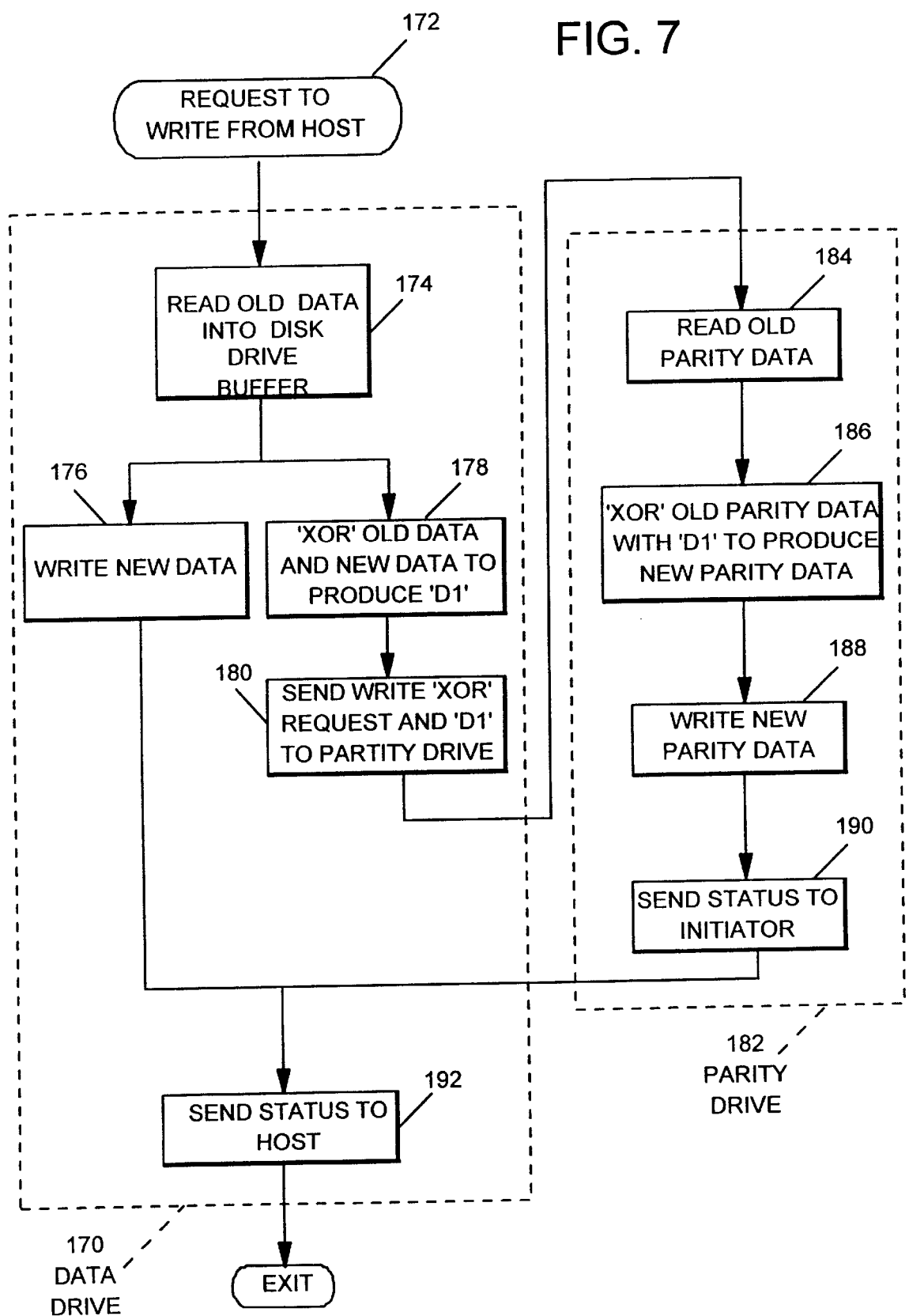
FIG. 7 is a flowchart of the steps taken in the process of writing to a selected data drive in accordance with the method and apparatus of the present invention.

FIG. 7, is flow chart of steps taken in the process of writing to a selected data drive in accordance with the method and apparatus of the present invention. As illustrated, data drive 170 receives a request to write data from the host data processing system, as illustrated at block 172. Within data drive 170, the process reads old data from the location specified by the LBA in the write request, and places such old data into a DRAID drive buffer, as depicted at block 174. The process then writes new data in data drive 170 at the address specified by LBA in the write request, as illustrated at block 176. During substantially the same period of time, the process performs an exclusive-OR operation between the old data in the DRAID drive buffer and the new data from the host, as depicted at block 178. Such an exclusive-OR operation produces data referred to as "D1."

After producing data "D1," the process sends a write-XOR request and "D1" to the parity drive associated with the LBA in the write request from the host data processing system, as illustrated at block 180.

Parity drive 182, upon receiving such write-XOR request and data "D1", reads the old parity data associated with the LBA from the host data processing system, as depicted at block 184. Thereafter, the process executes an XOR operation in parity drive 182 between the old parity data and data "D1", as illustrated at block 186. Such an XOR operation produces new parity data. Next, the process writes the new parity data in parity drive 182, as depicted at block 188. After writing new parity data, parity drive 182 sends status to the initiating drive, which in this example, is data drive 170, as illustrated at block 190.

After data drive 170 receives status from parity drive 182, data drive 170 sends status to the host data processing system, as depicted at block 192. The write process is then terminated at block 194. The data drive 170 may implement a battery backed up NVRAM to store the image of the active host write command 172 until the it receives a status from the parity drive 182. This is done to ensure consistent parity in the event of sudden power outage from the data drive 170. At every power on the data drive checks the NVRAM to make sure there is no write operation in progress. In the event of incomplete write operation the data drive 170 initiates operation to recompute corresponding parity.

Read Operation in Degraded Mode

When a master buddy DRAID drive, or the host data processing system, determines that a drive in the array has failed, the DRAID enters a degraded mode.

Means for detecting a failed drive will be discussed in greater detail below. When, in the degraded mode, the host data processing system requests a read operation from a fully functional drive in the array, the read operation is processed normally; the fully functioning drive responds with the requested data. However, when a read request from the host is directed to a failed DRAID drive, the master buddy of that failed DRAID drive responds to the request from the host data processing system in the place of the failed drive. Thus, from the point of view of the host, the failed DRAID drive has correctly responded to the read operation; the host may not be able to distinguish between a response from the failed drive and a response from the failed drive's master buddy acting on its behalf.

The master buddy associated with the failed DRAID drive maintains a map of the slave buddy's data and the location of the parity data associated with such data. When a read request is sent to the failed drive, the master buddy utilizes this map to determine which DRAID drives in the array must be read to obtain data necessary to reconstruct the requested data.

In the data reconstruction process, the master buddy determines the location of data that must be read, and then constructs a list of DRAID drives and corresponding logical block addresses (LBAS) that must be read to reconstruct data originally stored in the failed DRAID drive using well known XORing techniques. This list of drives and locations that must be read is then passed to the DRAID drive in the array having the highest ID in the list. Upon receiving such a list, the drive having the highest ID then removes its ID from the list, along with the associated information pertaining to the drive having the highest ID. Such information may include commands and LBAs of data that must be read from that DRAID drive. The DRAID drive also put a read only lock, i.e. the sector can be read but not written into, on the sectors requested by the commands until it received the data to be reconstructed from other drives. The DRAID drive having the highest ID then passes the remaining information and/or commands in the list to the drive that has the highest ID in the modified list (i.e., the drive having the next highest ID in the original list). By so passing such information/commands to another DRAID drive, the DRAID drive having the highest ID initiates an action in the DRAID drive receiving such information/commands. Thus, the DRAID drive having the highest ID may expect a response from the DRAID drive receiving such information/commands.

When all the drives in the array have received information/commands intended for each respective drive, the last drive in the list reads the data requested by such information/commands and passes this data back to the drive that initiated the request. The drive that initiated the request then XORs the received data and the data read from its own media, in response to receiving a request, and passes this result back to its initiator drive. This process of receiving data, processing data, and passing data to another DRAID drive is continued until the master buddy receives data from the drive with the highest ID in the original list. The master buddy then performs an XOR operation between data it receives and the data read from its media, and sends the result, which is the reconstructed data, to the host.

Figure 8A:
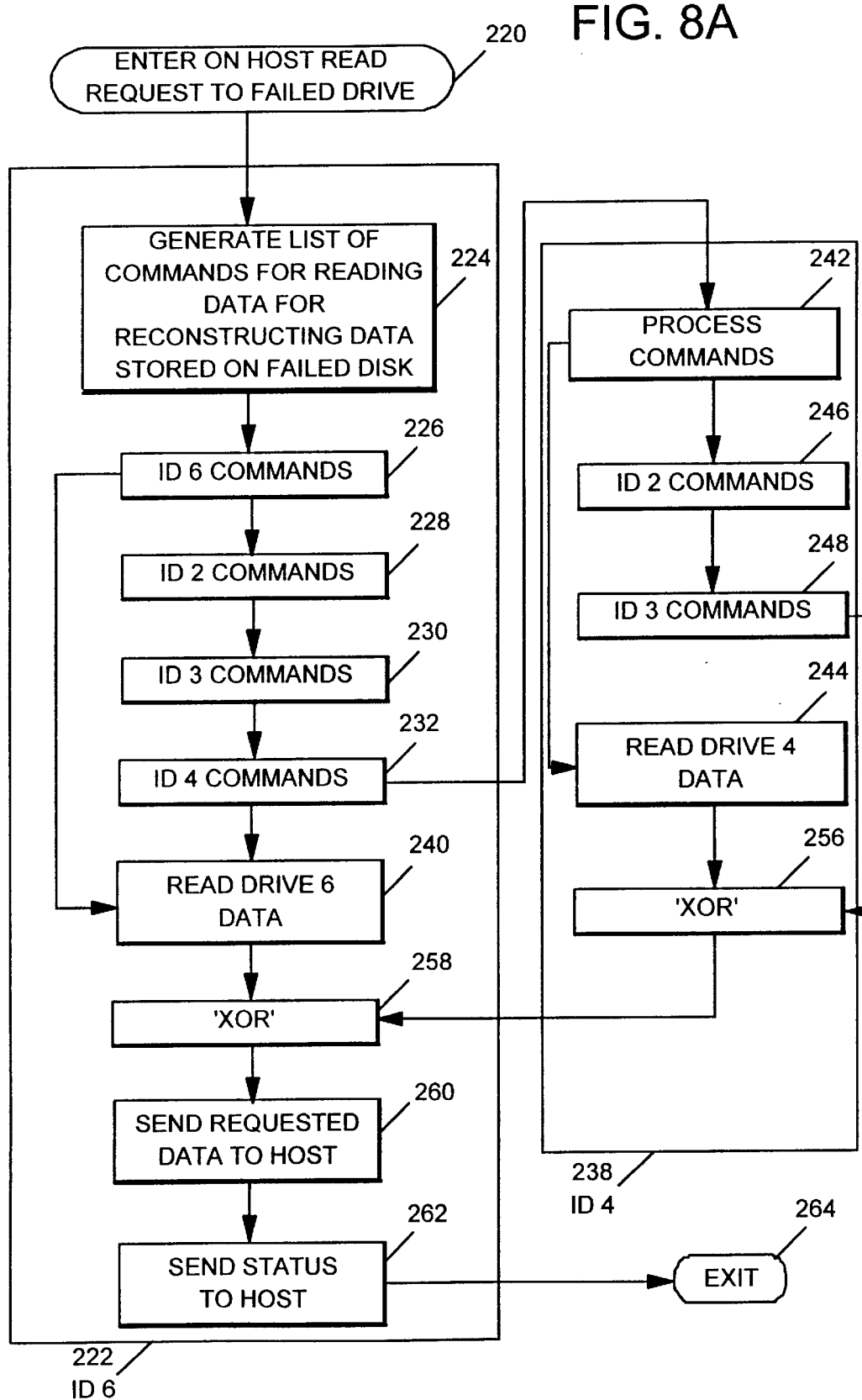
FIGS. 8, 8A, and 8B represent a flowchart of the steps taken in the process of reading from a failed disk drive in a DRAID in accordance with the method and apparatus of the present invention.
Figures 8, 8B:
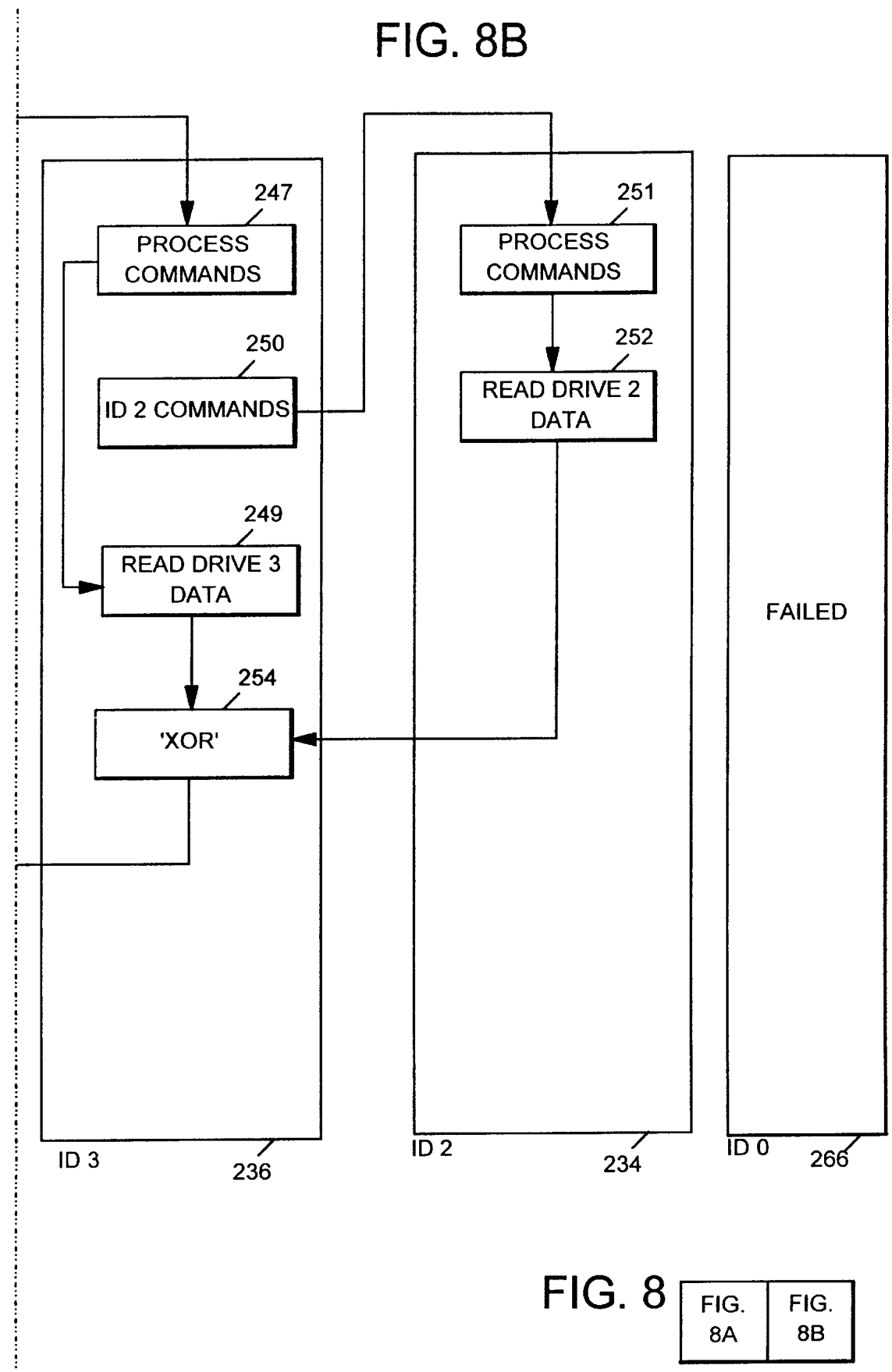

FIG. 8 depicts flowchart and data flow diagram of the steps taken in the process of reading from a failed DRAID drive in a DRAID in accordance with the method and apparatus of the present invention. As illustrated, the process begins at block 220 when the host data processing system addresses a read request to a failed-drive in the DRAID. Thereafter, DRAID drive 222, which is the master buddy of the failed DRAID drive 266, generates a list of read commands for reading data necessary to reconstruct data stored on failed DRAID drive 266, as illustrated at block 224. Blocks 226–232 represent commands and LBAs which are intended for other DRAID drives in the DRAID. Block 226 contains commands and LBAs intended for DRAID drive 222 which has been assigned ID 6, block 228 contains commands and LBAs intended for DRAID drive 234 which has been assigned drive ID 2, block 230 contains commands and LBAs intended for DRAID drive 236 which has been assigned ID 3, and block 232 contains commands and LBAs intended for DRAID drive 238 which has been assigned drive ID 4.

Once such command lists have been generated, DRAID drive 222 executes the commands intended for drive 222, as depicted at block 240, and sends command lists 228, 230, and 232 to the DRAID drive in the array having the highest ID in the list, excluding the ID of the master buddy, which in this case is drive 222. Such a transfer of a command list is illustrated by the arrow from DRAID drive 222 to DRAID drive 238.

Upon receiving the list of commands, drive 238 processes the list of commands intended for drive ID 4, as depicted at block 242. Such commands intended for drive ID 4 are executed within drive 238, as illustrated at block 244. In this example, block 244 depicts the process of reading data having a specified LBA within drive 238. After removing commands intended for drive 238, the process forwards commands intended for drives 234 and 236, as indicated at blocks 246 and 248, and the arrow from drive 238 to drive 236.

Upon receipt of such a command list, DRAID drive 236 processes commands intended for drive 236, which has the drive ID 3, as illustrated at block 247. Such commands intended for drive ID 3 are then executed, as depicted at block 249. In this example, the command intended for drive ID 3 is a read command from a specified LBA. Thereafter, commands intended for drive 234, which has been assigned drive ID 2, are forwarded to drive 234, as illustrated at block 250.

Upon receiving commands intended for drive 234 from drive 236, drive 234 processes the commands, as depicted at block 251. Thereafter, the process reads data from a specified LBA and, as directed by commands from drive 236, and then sends such data to drive 236, as illustrated at block 252.

Upon receiving data from drive 234, the process performs an XOR operation in drive 236 between data read from drive 236 and data read and transferred from drive 234, as depicted at block 254. The result of such an XOR operation is then transferred to drive 238.

When drive 238 receives the result of the XOR operation in drive 236, the process performs an XOR operation in drive 238 between data read from drive 238 and the result of a previous XOR operation in drive 236, as illustrated at block 256. The result of this XOR operation in drive 238 is then transferred to drive 222.

When drive 222 receives the result of the XOR operation performed in drive 238, the process performs an XOR operation in drive 222 between data read from drive 222 and the result of the XOR operation performed in drive 238, as depicted at block 258. The result of such an XOR operation in drive 222 is the data requested by the host data processing system. As illustrated at block 260, the process then sends the requested data to the host data processing system. Next, the process sends a status report to the host data processing system, as depicted at block 262. The process then terminates, as illustrated at block 264.

The process described above is able to reconstruct data stored in failed DRAID drive 266 because the data in failed drive 266 is equal to:

$$D2.XOR. D3.XOR. D4.XOR. D6$$

where D2 is data read from drive 234, D3 is data read from drive 236, D4 is data read from drive 238, and D6 is data read from drive 222. According to an important aspect of the present invention, the XOR operations needed to reconstruct requested data have been distributed among the drives in the DRAID, rather than performed in a central RAID controller, as is the case in the prior art.

Write Operation in Degraded Mode If a request for a write operation is directed to a fully functioning drive, and that fully functioning drive has an associated parity drive that is also fully functioning, such a write operation proceeds in a normal manner. However, if the host data processing system requests a write operation to a DRAID drive having a failed parity drive, such data is written only to the data drive and status is sent to the host data processing system indicating that a parity data write operation has failed.

In yet a third situation, if a data processing system requests a write operation to a failed DRAID drive, such a write request is intercepted by the master buddy of the failed DRAID drive. This master buddy then constructs a list of information/commands which may initiate read operations and data processing operations in other DRAID drives in the array, and sends such information/commands to the other DRAID drives in the array in a manner similar to the passing of information/commands during a read operation in a degraded mode described above. Additionally, the master buddy reads old data from its own DRAID drive and performs an XOR operation between such old data and the new data received from the host. Both the information/command list and the result of the XOR operation are then transmitted to the parity drive.

Upon receiving this information/command list, the parity drive passes the information/command list to the other drives in the array so that the other drives will compute the data necessary to ultimately compute new parity data. Once new parity data has been computed and written in the parity drive, the parity drive send status back to the initiating master buddy drive. The master buddy then sends status to the host data processing system.

Figure 9A:
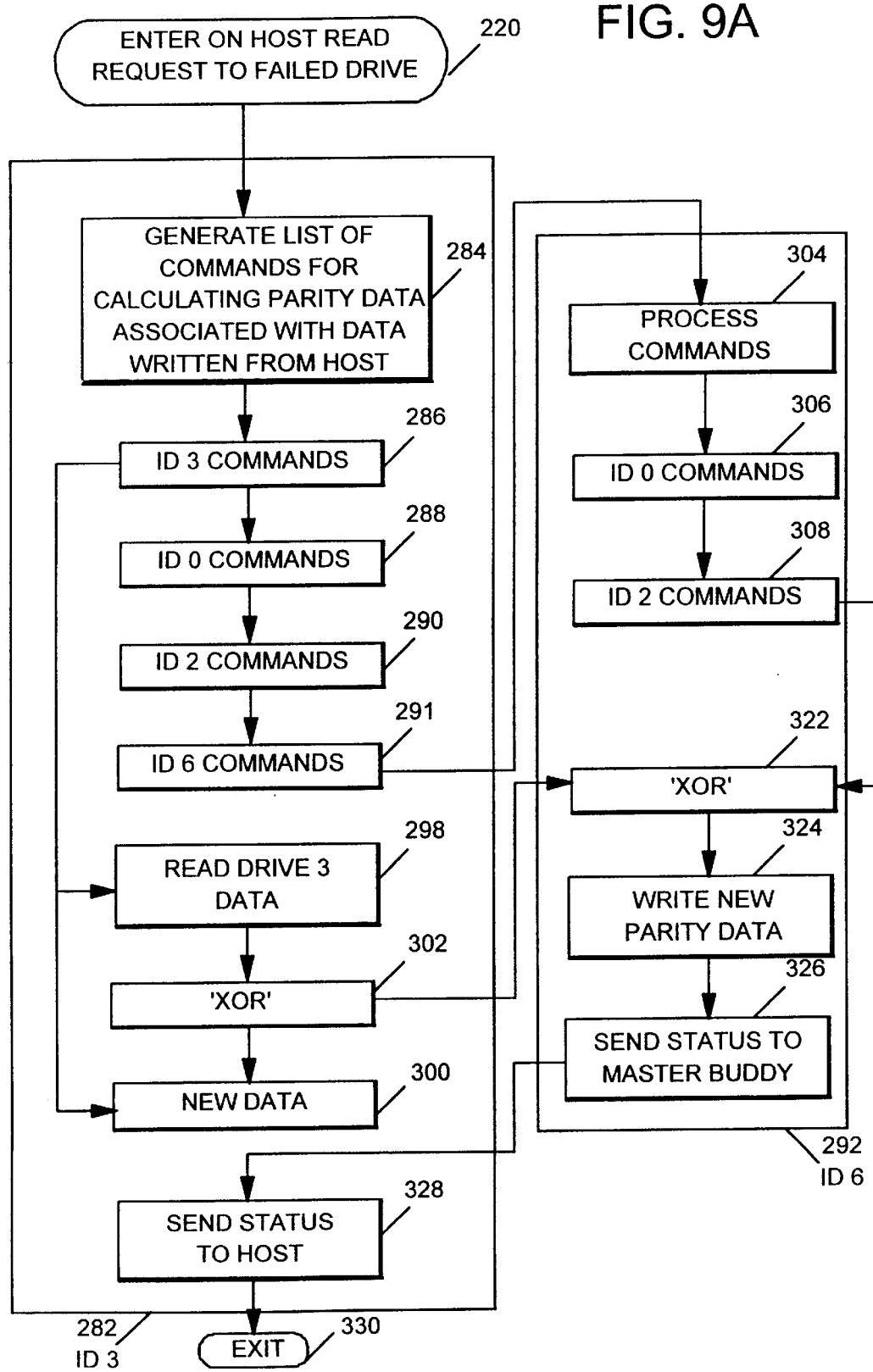
Figure 9B:
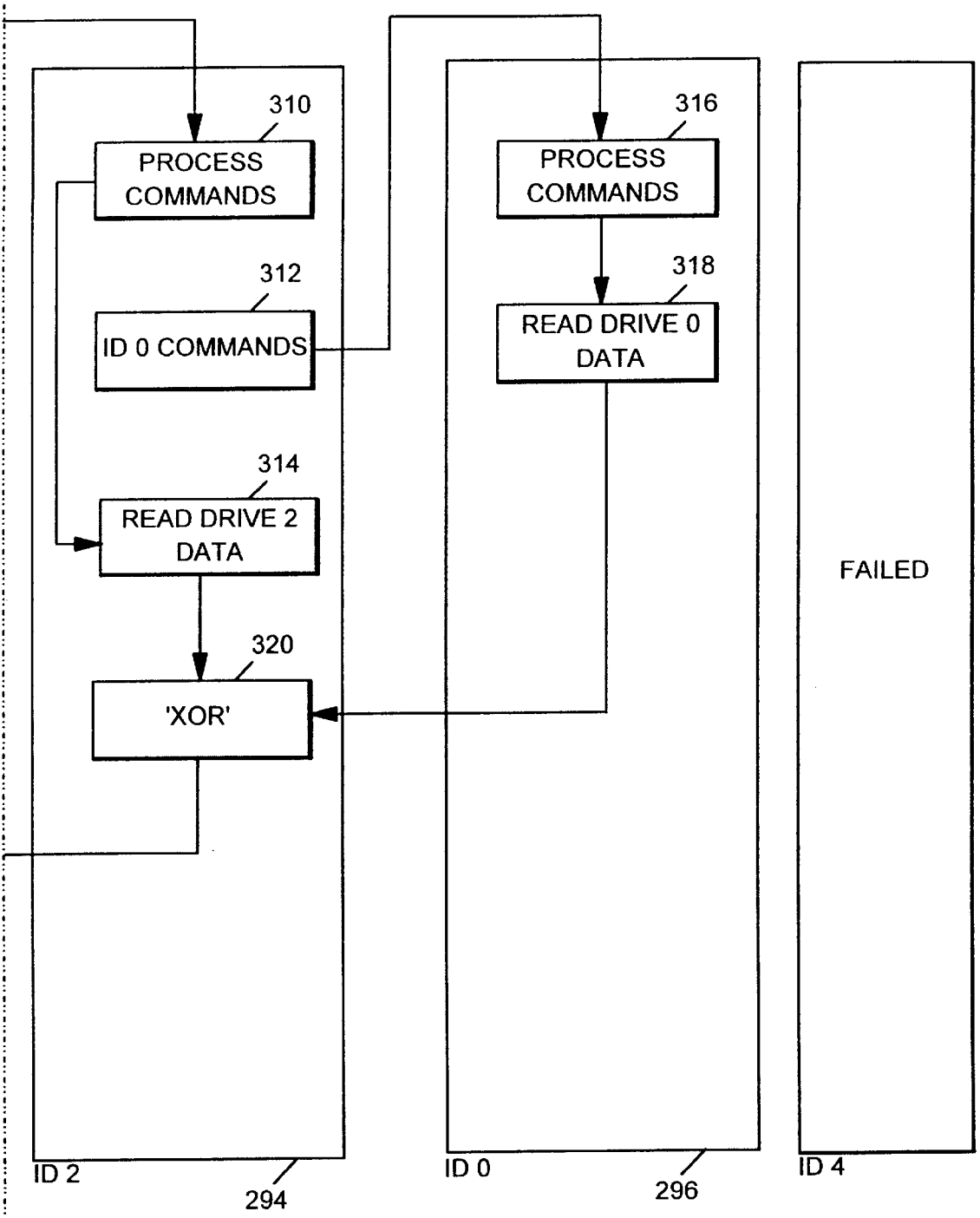

With reference now to FIG. 9, there is depicted a high-level logic flowchart and data flow diagram which illustrates the process of writing to a failed DRAID drive in a DRAID in accordance with the method and apparatus of the present invention. As illustrated, the process begins at block 280 when the host data processing system attempts to write data to a failed DRAID drive. Thereafter, the process generates a list of commands necessary to compute parity data associated with the data written by the host data processing system to the failed DRAID drive, as illustrated at block 284. The generation of such a command list is performed within drive 282. Such a list of commands is depicted by blocks 286, 288, 290, and 291, and includes commands intended for DRAID drive 282, commands intended for DRAID drive 296, commands intended for drive 294, and commands intended for parity drive 292.

Commands executed within drive 282 include a command to read data from drive 3 at a specified LBA, as depicted at block 298, and a command to perform an XOR operation between the data read from drive 3 and the new data written by the host data processing system, as illustrated at blocks 300 and 302. After such an XOR operation is performed in drive 282, the result is transferred to parity drive 292. In addition to the result of the XOR operation, the command list is also transferred to parity drive 292.

Upon receiving the data and command list transferred from drive 282, parity drive 292 forwards the appropriate command lists to drive 294, which is the drive which has the next highest ID in the array of DRAID drives besides the parity drive and the master buddy drive.

Upon receiving such a command list, drive 294 processes commands intended for drive 294, as illustrated at block 310. Thereafter, drive 294 transfers commands intended for drive 296 to drive 296, as depicted at block 312. Also within drive 294, a read command is executed, as illustrated at block 314.

Upon receiving the command list intended for drive 296, drive 296 processes the commands, as depicted at block 316, and executes a read operation, as illustrated at block 318. After reading data from drive 296, drive 296 transfers data to drive 294.

When drive 294 receives the requested data from drive 296, the process performs an XOR operation within drive 294 between data read from drive 294 and data requested and transferred from drive 296. The result of such an XOR operation is then transferred from drive 294 to parity drive 292.

When parity drive 292 has received the result of the XOR operation in drive 294 and the result of the XOR operation in drive 282, the process performs another XOR operation between the data transferred from drive 294 and the data transferred from drive 282, as depicted at block 322. The result of the XOR operation at block 322 is the new parity data. The new parity data is then written in parity drive 292, as illustrated at block 324. DRAID drive 292 then sends status to master buddy drive 282 indicating that the new parity has been written in parity drive 292, as depicted at block 326.

Upon receiving status indicating that new parity data has been written, master buddy drive 282 sends status to the host, as illustrated at block 328. The process then terminates as depicted at block 330.

Failed Drive Detection

Two schemes that may be utilized to detect a failed drive in the array of drives are discussed below. The first scheme relies on the assumption that if a drive selection time-out occurs, the device operation at least once will retry the operation at least once more. If a master buddy determines that a slave buddy has not responded to a selection, the master buddy may assume that the slave buddy drive has failed, and thereafter respond to the host on behalf of the failed slave buddy drive. In this scheme, the master buddy drive may monitor the SCSI status of the slave buddy drive to determine the nature of the slave buddy malfunction. The master buddy may also interrogate the slave buddy or cause the slave buddy to run a short diagnostic routine, before responding on behalf of the slave buddy drive.

Dead drive detection may also be implemented within the device driver running in the host data processing system. If dead drive detection is implemented within the host data processing system, a DRAID drive may be declared failed if it does not respond within a certain period of time, or if a drive exceeds a preselected error threshold. After a DRAID drive has been declared failed by the host data processing system, the host may route subsequent I/O requests to the master buddy drive of the failed drive. Such I/O rerouted requests may be coded so that the master buddy drive may be made aware that the I/O requests were intended for its failed slave buddy. This enables the master buddy to distinguish such requests from requests that are directed to the master buddy drive.

In a second scheme for detecting a failed drive, each drive communicates with an associated master buddy and slave buddy via two serial ports. Periodically, each drive sends a status message to its master buddy indicating that it has not failed. If such a message is not received by the master buddy, the slave buddy drive is declared failed. In this configuration, it may be necessary to override a master buddy drive sending a "kill command" to a slave buddy when that master buddy drive is experiencing an error rate exceeding a preselected threshold.

Figure 10:
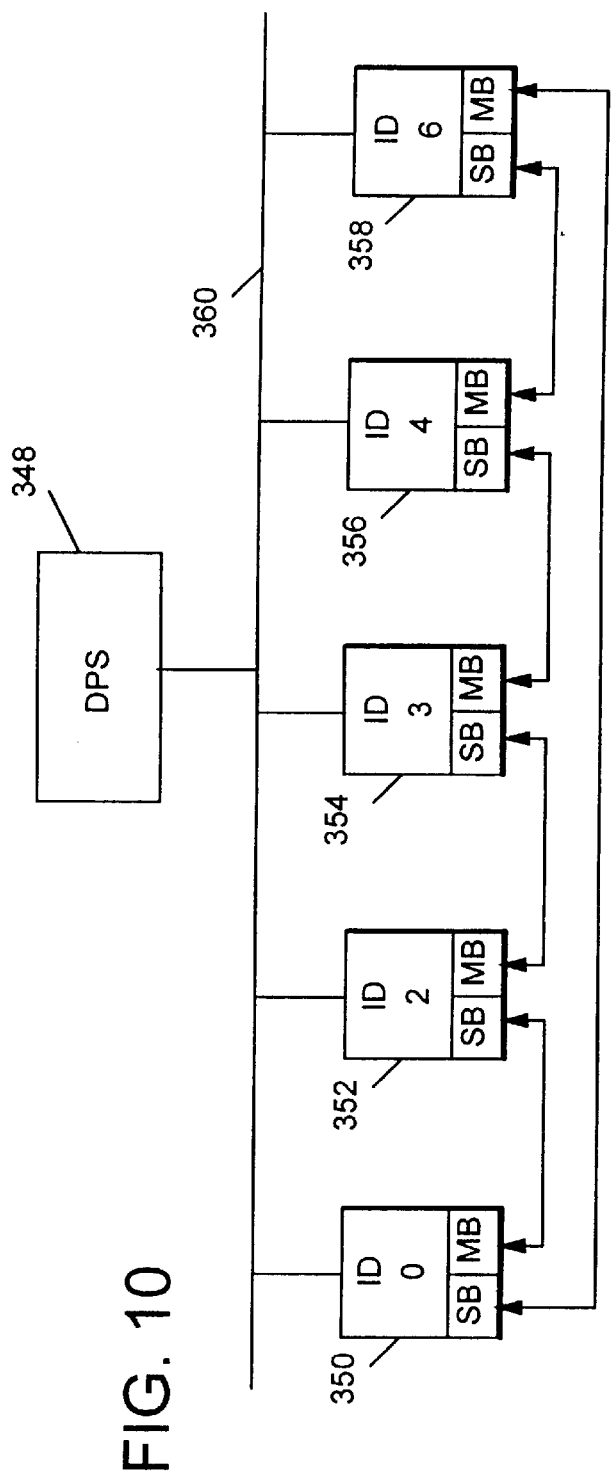
FIG. 10 is a block diagram of a DRAID wherein each disk drive communicates with its master buddy and slave buddy via serial ports in accordance with the method and apparatus of the present invention.

In this embodiment, the serial ports may also be used to exchange configuration information among drives in the array, and to provide a low speed serial bus for array maintenance. FIG. 10 illustrates such an array maintenance bus.

With reference now to FIG. 10, there is depicted a block diagram of a DRAID wherein each DRAID drive communicates with its master buddy and slave buddy via serial ports in accordance with the method and apparatus of the present invention. As illustrated, host data processing system 348 is coupled to DRAID drives 350–358 via SCSI bus 360 which, as is known in the art, is connected to a SCSI port (not shown) of such host data processing system. Each DRAID drive 350–358 includes two serial ports: one serial part is marked SB, and the other serial port is marked MB. The MB port of drive 350 (i.e., the master buddy port) is connected to the SB port (i.e., the slave buddy port) of drive 352. Thus, the MB port of drive 350 is connected to the master buddy drive of drive 350, which in this example is drive 352. Similarly, the SB port of drive 352 is connected to the slave buddy of drive 352, which in this example is drive 350. Drives 354-358 are connected in a similar fashion as shown.

Drive Replacement

When a DRAID drive in the array is replaced, the replaced drive's master buddy may detect the presence of a new functioning drive. Once the replacement of a failed drive has been detected, the array enters a rebuild mode. If the new drive is not a replacement of a failed drive, the new drive attempts to form a new array with other drives in the DRAID mode that are not already part of an array. If such a replaced drive finds no other uninitialized drive in the DRAID mode, then such a replaced drive operates like an ordinary drive, independent of the existing DRAID. In the event that a central disk monitoring sub-system is used, the detected replaced drive may be reconstructed b transmitting appropriate reconstruction commands to the replaced drive.

Data Rebuild

Once a new drive has replaced a failed drive, the new drive executes an initialization and configuration sequence as described above. After successfully completing the initialization and configuration sequences, the master buddy drive associated with the newly replaced drive updates its configuration information and stops servicing requests from the host data processing system directed to the newly replaced drive. Thereafter, the newly replaced drive may service requests directed to it while it is rebuilding data.

Rebuilding data is similar to a degraded read operation except that reconstructed data is sent to the newly replaced drive instead of the host. As the newly replaced drive rebuilds data, a marker is maintained at the LBA that divides rebuilt data from invalid data. If the LBA of the read or write request from the host falls in the rebuilt data area, the drive services the request as an ordinary read or write request. However, if the LBA of the read or write request falls in the invalid data area, such a request is serviced by reconstructing the data from the other drives of the array, as if the newly replaced drive is still not functioning.

User Notification of Failed Drive

When a DRAID drive in the array fails, the failure may be detected by the DRAID drive's master buddy. Once the master buddy has a detected its slave buddy has failed, that master buddy may notify the host data processing system.

The host data processing system may then inform the data processing system user by displaying a message on the data processing system display or by invoking a special monitor/administration program. Additionally, the master buddy may cause an audible alarm or light to flash in the failed DRAID drive, thereby indicating a failure to the data processing user.

While the invention has been particularly shown and described with reference to a preferred embodiment, it will be understood by those skilled in the art that various changes in form and detail may be made therein without departing from the spirit and scope of the invention.

What is claimed is:

1. An information handling system comprising:
   a processor complex including means for generating a write command to write new data at a selected logical address;
   an I/O bus for transferring data between to and from said processor complex;
   a storage device subsystem coupled to said I/O bus including a redundant array of storage devices comprising: at least a first storage device including:
   means for receiving said write command from said processor complex;
   means for reading old data located at said selected logical address within said first storage device;
   means for writing said new data at said selected logical address within said first storage device within said redundant array of storage devices;
   means for performing a logical operation within said first storage device between said new data and said old data to produce intermediate data;
   means for transferring said intermediate data to over an input/output (I/O) bus
   a second storage device within said redundant array of storage devices including:
   means for receiving said intermediate data over said bus;
   means for reading old parity data located within said second storage device, wherein said old parity data corresponds to said old data; and
   means performing a logical operation within said second storage device between said intermediate data and said old parity data to produce new parity data.

2. The apparatus of claim 1, wherein said second storage device further include means for writing said new parity data into said second storage devices.

3. The apparatus of claim 1 wherein said logical processor within said first storage device include means for performing an exclusive-or operation.

4. The apparatus of claim 1 wherein said logical processor within said second storage device include means for performing an exclusive-or operation.

5. The apparatus of claim 1 wherein said I/O bus is a small computer system interface (SCSI) bus.

6. The apparatus of claim 1 further including:
   means for detecting a failed storage device within said redundant array of storage devices
   means for receiving a read command from a said processor complex to read data at from a selected logical address within said failed storage device within said redundant array of storage devices,
   means for reading old data located at said selected logical address within said first storage device;
   means for performing a logical operation within said first storage device between said new data and said old data to produce intermediate data;
   means for transferring said intermediate data to a second storage device within said redundant array of storage devices;
   within said second storage device,
   means for reading old parity data located within said second storage device, wherein said old parity data corresponds to said old data; and
   means for performing a logical operation within said second storage device between said intermediate data and said old parity data to produce new parity data.

7. An apparatus for storing and retrieving data received from a connected data processing system, said apparatus comprising:
   a plurality of storage units for performing data processing operations, each having a dedicated controller wherein said dedicated controller includes:
   (a) means for calculating parity data;
   (b) means for monitoring said data processing operations within a selected one of said plurality of storage units;
   (c) means for generating commands for execution by a selected one of said dedicated controllers in a selected one of said plurality of storage units; and
   (d) means for transferring data to a selected one of said plurality of storage units; and
   communication means coupled to each of said dedicated controllers within each of said storage units for communicating said commands and data between said dedicated controllers, wherein said means for monitoring said data processing operations within a selected one of said plurality of storage units includes means for monitoring said data processing operations within a slave buddy.

8. An apparatus for storing and retrieving data received from a connected data processing system, said apparatus comprising:
   a plurality of storage units for performing data processing operations, each having a dedicated controller wherein said dedicated controller includes:
   (a) means for calculating parity data;
   (b) means for monitoring said data processing operations within a selected one of said plurality of storage units;
   (c) means for generating commands for execution by a selected one of said dedicated controllers in a selected one of said plurality of storage units; and
   (d) means for transferring data to a selected one of said plurality of storage units; and
   communication means coupled to each of said dedicated controllers within each of said storage units for communicating said commands and data between said dedicated controllers, wherein said means for generating commands for execution by a selected one of said dedicated controllers in a selected one of said plurality of storage units includes means for generating commands for reconstructing data from data stored in selected ones of said plurality of storage units, wherein said commands are intended for execution by selected ones of said dedicated controllers in said plurality of storage units.

* * * * *